United States Patent
Leising et al.

(10) Patent No.: US 7,211,349 B2
(45) Date of Patent: May 1, 2007

(54) SILVER VANADIUM OXIDE PROVIDED WITH A METAL OXIDE COATING

(75) Inventors: Randolph Leising, Williamsville, NY (US); Esther S. Takeuchi, East Amherst, NY (US)

(73) Assignee: Wilson Greatbatch Technologies, Inc., Clarence, NY (US)

(*) Notice: Subject to any disclaimer, the term of this patent is extended or adjusted under 35 U.S.C. 154(b) by 627 days.

(21) Appl. No.: 10/631,097

(22) Filed: Jul. 31, 2003

(65) Prior Publication Data

US 2004/0029005 A1 Feb. 12, 2004

Related U.S. Application Data

(60) Provisional application No. 60/401,425, filed on Aug. 6, 2002.

(51) Int. Cl.
H01M 4/34 (2006.01)

(52) U.S. Cl. .................. 429/219; 429/220; 429/221; 429/224; 429/231.1; 429/231.3; 429/231.5; 429/231.95; 429/332; 429/128

(58) Field of Classification Search ............. 429/218.1, 429/219, 220, 221, 224, 231.1, 231.3, 231.5, 429/231.95, 332, 128
See application file for complete search history.

(56) References Cited

U.S. PATENT DOCUMENTS

| | | | |
|---|---|---|---|
| 4,016,338 A | 4/1977 | Lauck | |
| 4,158,722 A | 6/1979 | Lauck et al. | |
| 4,310,609 A | 1/1982 | Liang et al. | |
| 4,391,729 A | 7/1983 | Liang et al. | |
| 4,542,083 A | 9/1985 | Cava et al. | |
| 4,675,260 A | 6/1987 | Sakurai et al. | |
| 4,751,157 A | 6/1988 | Uchiyama et al. | |
| 4,751,158 A | 6/1988 | Uchiyama et al. | |
| 4,803,137 A | 2/1989 | Miyazaki et al. | |
| 4,830,940 A | 5/1989 | Keister et al. | |
| 4,964,877 A | 10/1990 | Keister et al. | |
| 4,965,151 A | 10/1990 | Takada et al. | |
| 5,194,342 A | 3/1993 | Bito et al. | |

(Continued)

FOREIGN PATENT DOCUMENTS

EP 0 638 946 A2 2/1995

(Continued)

OTHER PUBLICATIONS

Solid-State Cathode Materials for Lithium Batteries: Effect of Synthesis Temperature on the Physical and Electrochemical Properties of Silver Vanadium Oxide, Randolph A. Leising and Esther Sans Takeuchi, Chemistry of Materials, 1993.

(Continued)

*Primary Examiner*—Laura Weiner
(74) *Attorney, Agent, or Firm*—Michael F. Scalise

(57) ABSTRACT

An improved cathode material for nonaqueous electrolyte lithium electrochemical cell is described. The preferred active material is $\epsilon$-phase silver vanadium oxide ($Ag_2V_4O_{11}$) coated with a protective layer of a metal oxide, preferably $\gamma$-phase SVO ($Ag_{1.2}V_3O_{1.8}$). The SVO core provides high capacity and rate capability while the protective coating reduces reactivity of the active particles with electrolyte to improve the long-term stability of the cathode.

20 Claims, 4 Drawing Sheets

U.S. PATENT DOCUMENTS

| | | |
|---|---|---|
| 5,221,453 A | 6/1993 | Crespi |
| 5,298,349 A | 3/1994 | Takeuchi |
| 5,389,472 A | 2/1995 | Takeuchi et al. |
| 5,458,997 A | 10/1995 | Crespi et al. |
| 5,472,810 A | 12/1995 | Takeuchi et al. |
| 5,498,494 A | 3/1996 | Takeuchi et al. |
| 5,498,495 A | 3/1996 | Takada et al. |
| 5,512,214 A | 4/1996 | Koksbang |
| 5,516,340 A | 5/1996 | Takeuchi et al. |
| 5,545,497 A | 8/1996 | Takeuchi et al. |
| 5,558,680 A | 9/1996 | Takeuchi et al. |
| 5,567,538 A | 10/1996 | Oltman et al. |
| 5,670,276 A | 9/1997 | Takeuchi et al. |
| 5,695,892 A | 12/1997 | Leising et al. |
| 5,895,733 A | 4/1999 | Crespi et al. |
| 5,935,724 A | 8/1999 | Spillman et al. |
| 5,935,728 A | 8/1999 | Spillman et al. |
| 5,955,218 A | 9/1999 | Crespi et al. |
| 6,093,506 A | 7/2000 | Crespi et al. |
| 6,130,005 A | 10/2000 | Crespi et al. |
| 6,180,283 B1 | 1/2001 | Gan et al. |
| 6,372,385 B1* | 4/2002 | Kweon et al. ............ 429/218.1 |
| 6,413,669 B1 | 7/2002 | Takeuchi et al. |
| 6,458,487 B1* | 10/2002 | Takeuchi et al. .......... 429/231.1 |
| 6,534,217 B2* | 3/2003 | Koga et al. ............... 429/218.1 |
| 6,558,845 B1 | 5/2003 | Leising et al. |
| 6,566,007 B1 | 5/2003 | Takeuchi et al. |
| 6,737,195 B2* | 5/2004 | Kweon et al. ............ 429/231.1 |
| 2003/0082449 A1* | 5/2003 | Gan et al. .................... 429/219 |

FOREIGN PATENT DOCUMENTS

| | | |
|---|---|---|
| EP | 1 143 545 A1 | 10/2001 |
| EP | 1 220 342 A2 | 7/2002 |
| EP | 1 331 683 A2 | 7/2003 |

OTHER PUBLICATIONS

Solid-State Synthesisand Characterization of Silver Vanadium Oxide for Use as a Cathode Material for Lithium Batteries, Randolph a Leising and Esther Sans Takeuchi, Chemistry of Materials, 1994.

Vanadium Pentoxide Gels, J. Livage, Chem. Mater. 1991, 3, 578-593.

K. J. Takeuchi et al./Coordination Chemistry Reviews 219-221 (2001) 283-310.

* cited by examiner

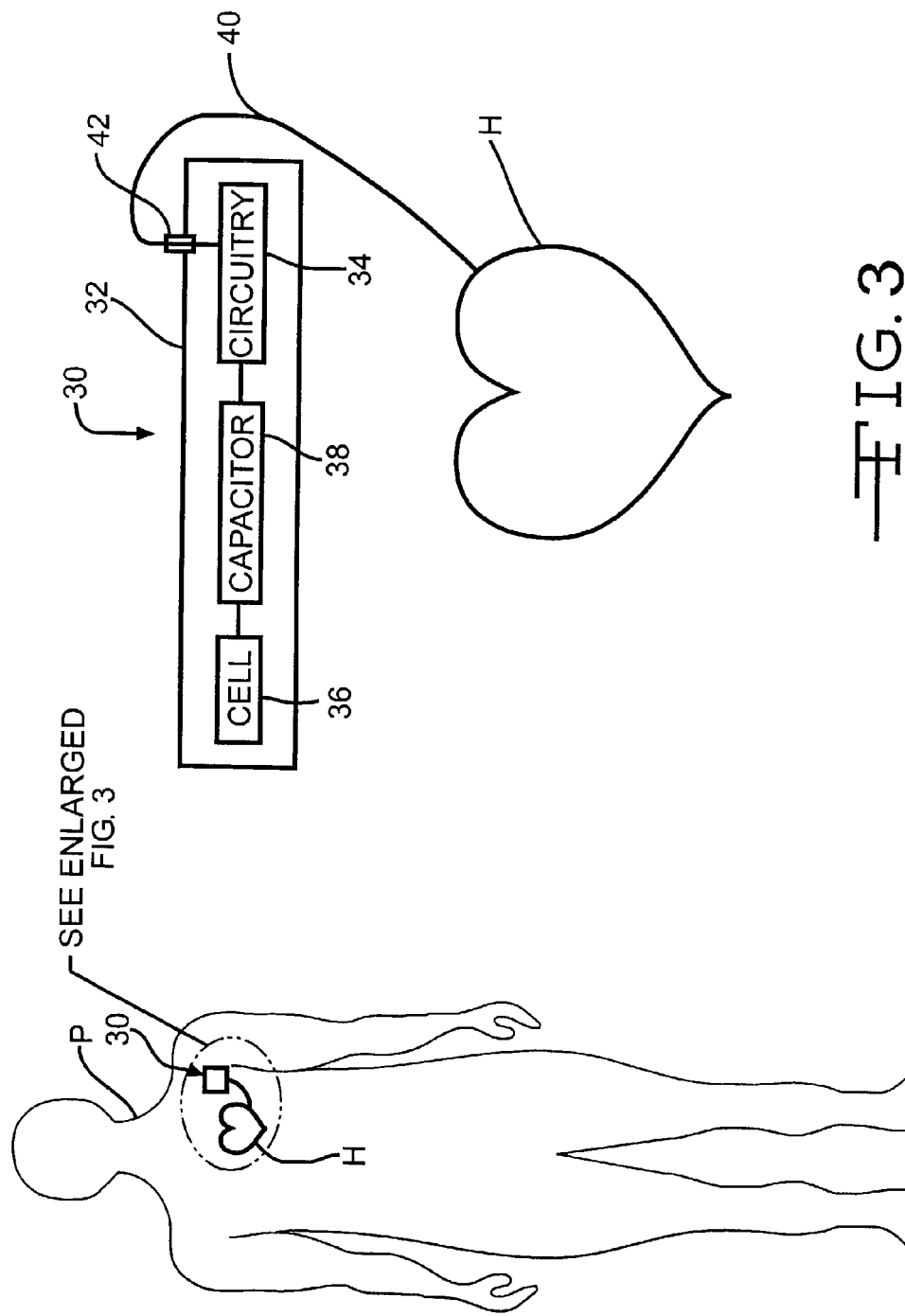

SILVER VANADIUM OXIDE PROVIDED WITH A METAL OXIDE COATING

CROSS-REFERENCE TO RELATED APPLICATION

This application claims priority based on provisional application Ser. No. 60/401,425, filed Aug. 6, 2002.

BACKGROUND OF THE INVENTION

1. Field of Invention

This invention relates to the conversion of chemical energy to electrical energy. In particular, the present invention relates to preparation of an improved cathode for lithium electrochemical cells. The cathode contains a first metal oxide or metal sulfide, preferably silver vanadium oxide (SVO) or copper silver vanadium oxide (CSVO), coated with a second metal oxide or metal sulfide different than the first. One preferred composition has a core of ε-phase SVO ($Ag_2V_4O_{11}$) provided with a coating of γ-phase SVO ($Ag_{1.2}V_3O_{1.8}$). The core ε-phase SVO provides the cell with relatively high capacity and rate capability while the γ-phase SVO protective coating improves long-term cathode stability by reducing particle reactivity with the electrolyte. Improved long-term stability translates into increased discharge life in a lithium electrochemical cell. A sol-gel process preferably performs the coating. An exemplary application is having the cell power an implantable cardiac defibrillator, where the cell may run under a light load for extended periods of time interrupted by high rate pulse

2. Prior Art

As is well known by those skilled in the art, an implantable cardiac defibrillator is a device that requires a power source for a generally medium rate, constant resistance load component provided by circuits performing such functions as, for example, the heart sensing and pacing functions. From time-to-time, the cardiac defibrillator may require a generally high rate, pulse discharge load component that occurs, for example, during charging of a capacitor in the defibrillator for the purpose of delivering an electrical shock to the heart to treat tachyarrhythmias, the irregular, rapid heartbeats that can be fatal if left uncorrected.

It is generally recognized that lithium cells containing silver vanadium oxide and, in particular, ε-phase silver vanadium oxide are preferred for powering cardiac defibrillators. U.S. Pat. Nos. 4,310,609 and 4,391,729, both to Liang et al., disclose the preparation of ε-phase SVO as a cathode material for use in a nonaqueous electrolyte electrochemical cell. These patents describe the preparation of silver vanadium oxide by a thermal decomposition reaction of silver nitrate with vanadium oxide ($V_2O_5$) at a maximum temperature of about 360° C. The Liang et al. patents are assigned to the assignee of the present invention and incorporated herein by reference.

The reason silver vanadium oxide is preferred for cardiac defibrillators is because of its relatively high rate capability. For example, U.S. Pat. No. 4,830,940 to Keister et al. discloses a primary cell containing silver vanadium oxide for delivering high current pulses with rapid recovery, high capacity and low self-discharge. The Keister et al. patent is assigned to the assignee of the present invention and incorporated herein by reference.

SUMMARY OF THE INVENTION

Accordingly, the present invention provides a process for preparing a composite cathode material containing a first metal oxide or metal sulfide coated with a protective second metal oxide or metal sulfide surface layer. A preferred embodiment of the invention has a ε-phase SVO or CSVO core coated with a protective metal oxide surface layer of γ-phase SVO, β-phase SVO ($Ag_{0.35}V_2O_{5.18}$) or $MnO_2$. These materials are preferably applied via a sol-gel process to provide a thin coating over the SVO or CSVO core. This results in a new composite material with improved performance over prior art cathode active materials. In particular, voltage delay and Rdc build-up during long-term cell discharge are reduced since the core cathode active material is isolated from the electrolyte.

These and other objects of the present invention will become increasingly more apparent to those skilled in the art by reference to the following description and to the appended drawings.

BRIEF DESCRIPTION OF THE DRAWINGS

FIG. 2 is a schematic of a patient P provided with an implantable medical device 30.

FIG. 3 is an enlarged schematic of the indicated area in FIG. 2 particularly showing the control circuitry 34, the electrochemical cell 36 and capacitor 38 for the medical device 100 connected to the patient's heart H.

DETAILED DESCRIPTION OF THE PREFERRED EMBODIMENTS

Figure 1:
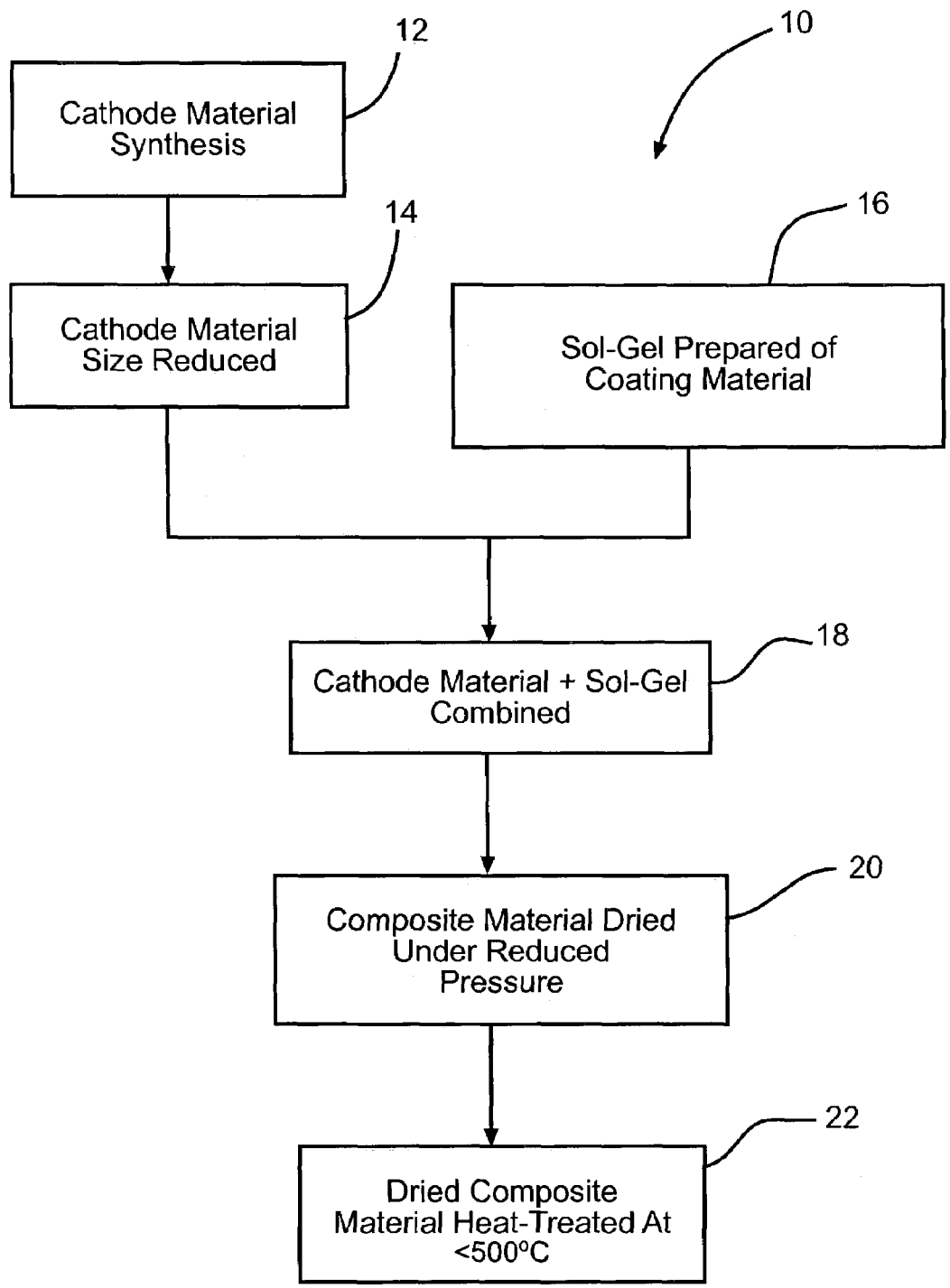
FIG. 1 is a flow chart illustrating the processing steps for coating a particle of active material with a metal oxide according to the present invention.

As used herein, the term "pulse" means a short burst of electrical current of significantly greater amplitude than that of a pre-pulse current immediately prior to the pulse. A pulse train consists of at least two pulses of electrical current delivered in relatively short succession with or without open circuit rest between the pulses. An exemplary pulse train may consist of four 10-second pulses (23.2 $mA/cm^2$) with a 15 second rest between each pulse. A typically used range of current densities for cells powering implantable medical devices is from about 15 $mA/cm^2$ to about 50 $mA/cm^2$, and more preferably from about 18 $mA/cm^2$ to about 35 $mA/cm^2$. Typically, a 10 second pulse is suitable for medical implantable applications. However, it could be significantly shorter or longer depending on the specific cell design and chemistry.

An electrochemical cell that possesses sufficient energy density and discharge capacity required to meet the vigorous requirements of implantable medical devices comprises an anode of a metal selected from Groups IA, IIA and IIIB of the Periodic Table of the Elements. Such anode active materials include lithium, sodium, potassium, etc., and their alloys and intermetallic compounds including, for example, Li—Si, Li—Al, Li—B and Li—Si—B alloys and intermetallic compounds. The preferred anode comprises lithium. An alternate anode comprises a lithium alloy such as a lithium-aluminum alloy. The greater the amounts of aluminum present by weight in the alloy, however, the lower the energy density of the cell.

The form of the anode may vary, but preferably the anode is a thin metal sheet or foil of the anode metal, pressed or rolled on a metallic anode current collector, i.e., preferably comprising titanium, titanium alloy or nickel, to form an anode component. Copper, tungsten and tantalum are also suitable materials for the anode current collector. In the exemplary cell of the present invention, the anode component has an extended tab or lead of the same material as the anode current collector, i.e., preferably nickel or titanium, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

The electrochemical cell of the present invention further comprises a cathode of electrically conductive material that serves as the other electrode of the cell. The cathode is preferably of solid materials comprising a metal element, a metal oxide, a mixed metal oxide and a metal sulfide, and combinations thereof. The cathode active material is formed by the chemical addition, reaction, or otherwise intimate contact of various metal oxides, metal sulfides and/or metal elements, preferably during thermal treatment, sol-gel formation, chemical vapor deposition or hydrothermal synthesis in mixed states. The active materials thereby produced contain metals, oxides and sulfides of Groups IB, IIB, IIIB, IVB, VB, VIB, VIIB and VIII, which includes the noble metals and/or other oxide and sulfide compounds. A preferred cathode active material is a reaction product of at least silver and vanadium.

One preferred mixed metal oxide has the general formula $SM_xV_2O_y$, where SM is a metal selected from Groups IB to VIIB and VIII of the Periodic Table of Elements, wherein x is about 0.30 to 2.0 and y is about 4.5 to 6.0 in the general formula. By way of illustration, and in no way intended to be limiting, one exemplary cathode active material comprises silver vanadium oxide having the general formula $Ag_xV_2O_y$, in either its β-phase having in the general formula x=0.35 and y=5.8, γ-phase silver vanadium oxide having in the general formula x=0.74 and y=5.37, or ε-phase having in the general formula x=1.0 and y=5.5, and combinations of phases thereof.

For a more detailed description of such cathode active materials, reference is made to U.S. Pat. No. 4,016,338 to Lauck, U.S. Pat. No. 4,158,722 to Lauck et al., U.S. Pat. No. 4,310,609 to Liang et al., U.S. Pat. No. 4,391,729 to Liang et al., U.S. Pat. No. 4,542,083 to Cava et al., U.S. Pat. No. 4,675,260 to Sakurai et al., U.S. Pat. No. 4,751,157 to Uchiyama et al., U.S. Pat. No. 4,751,158 to Uchiyama et al., U.S. Pat. No. 4,803,137 to Miyazaki et al., U.S. Pat. No. 4,830,940 to Keister et al., U.S. Pat. No. 4,964,877 to Keister et al., U.S. Pat. No. 4,965,151 to Takada et al., U.S. Pat. No. 5,194,342 to Bito et al., U.S. Pat. No. 5,221,453 to Crespi, U.S. Pat. No. 5,298,349 to Takeuchi, U.S. Pat. No. 5,389,472 to Takeuchi et al., U.S. Pat. No. 5,545,497 to Takeuchi et al., U.S. Pat. No. 5,458,997 to Crespi et al., U.S. Pat. No. 5,498,494 to Takeuchi et al., U.S. Pat. No. 5,498,495 to Takada et al., U.S. Pat. No. 5,512,214 to Koksbang, U.S. Pat. No. 5,558,680 to Takeuchi et al., U.S. Pat. No. 5,567,538 to Oltman et al., U.S. Pat. No. 5,670,276 to Takeuchi et al., U.S. Pat. No. 5,695,892 to Leising et al., U.S. Pat. No. 5,895,733 to Crespi et al., U.S. Pat. No. 5,955,218 to Crespi et al., U.S. Pat. No. 6,093,506 to Crespi et al., U.S. Pat. No. 6,130,005 to Crespi et al., U.S. Pat. No. 6,413,669 to Takeuchi et al., U.S. Pat. No. 6,558,845 to Leising et al. and U.S. Pat. No. 6,566,007 to Takeuchi et al. Prior art synthesis for SVO are also described in Leising, R. A.; Takeuchi, E. S. *Chem. Mater.* 1993, 5, 738–742 and Leising, R. A.; Takeuchi, E. S. *Chem. Mater.* 1994, 6, 489–495. The latter Leising et al. publication describes a preferred method for the synthesis of SVO with the caveat that the temperature is less than 500° C. to fully form the material. These patents and publications are incorporated herein by reference.

Another preferred composite metal oxide cathode material includes $V_2O_z$ wherein $z \leq 5$ combined with $Ag_2O$ with silver in either the silver(II), silver(I) or silver(0) oxidation state and CuO with copper in either the copper(II), copper(I) or copper(0) oxidation state to provide the mixed metal oxide having the general formula $Cu_xAg_yV_2O_z$, (CSVO). Thus, the composite cathode active material may be described as a metal oxide-metal oxide-metal oxide, a metal-metal oxide-metal oxide, or a metal-metal-metal oxide and the range of material compositions found for $Cu_xAg_yV_2O_z$ is preferably about $0.01 \leq z \leq 6.5$. Typical forms of CSVO are $Cu_{0.16}Ag_{0.67}V_2O_z$ with z being about 5.5 and $Cu_{0.5}Ag_{0.5}V_2O_z$ with z being about 5.75. The oxygen content is designated by z since the exact stoichiometric proportion of oxygen in CSVO can vary depending on whether the cathode material is prepared in an oxidizing atmosphere such as air or oxygen, or in an inert atmosphere such as argon, nitrogen and helium. For a more detailed description of this cathode active material reference is made to U.S. Pat. No. 5,472,810 to Takeuchi et al. and U.S. Pat. No. 5,516,340 to Takeuchi et al., both of which are assigned to the assignee of the present invention and incorporated herein by reference.

In addition to silver vanadium oxide and copper silver vanadium oxide $V_2O_5$, $MnO_2$, $LiCoO_2$, $LiNiO_2$, $LiMnO_2$, $LiMn_2O_4$, $TiS_2$, $Cu_2S$, FeS, $FeS_2$, $Ag_2O$, $Ag_2O_2$, CuF, $Ag_2CrO_4$, copper oxide, copper vanadium oxide, and mixtures thereof are useful as the core cathode active material. The coating material can be at least one of the above listed core cathode materials with the provision that the coating material cannot be the same as the core material.

FIG. 1 shows a flow chart that illustrates the process 10 used to coat the first metal oxide or metal sulfide core with a second metal oxide or metal sulfide different than the first according to the present invention. The process begins with synthesis of the core cathode active material in step 12. Next, the particle size of the cathode active material is reduced in step 14. This increases the material's surface area, which is beneficial for improved discharge efficiency. Several means are contemplated for reducing the size of the active particles including using a mortar and pestle, a ball mill, jet-mill, or by attrition. In addition, the core cathode active material may be used directly without particle size reduction.

A sol-gel solution 16 containing the metal oxide or metal sulfide coating material, for example γ-phase SVO, β-phase SVO or $MnO_2$, is prepared. The sol-gel solution can either be an aqueous or a non-aqueous based solution. Aqueous solutions include water and a minor amount of lithium hydroxide to bring the solution to a basic pH. Nonaqueous solutions are essentially alcohol based with methanol, ethanol, isopropyl. and isobutyl being preferred. At least one of the above listed cathode active materials serving as a core material is then added to the sol-gel solution to form a mixture in step 18. In this step, it is important to carefully control the ratio of the core material to the coating material in the solution. Preferably, the solution contains, by weight, a ratio of coating material to core material in the range of about 1:3 to about 1:20, 1:5 being preferred. Various reactions are involved in the conversion of a sol to a gel. Most desirable is a "polymerization" process in which molecules of the desired metal oxide coated or metal sulfide cathode active core material are formed.

Gelation is the mechanism that essentially causes inorganic polymers to form and grow, causing an increase in viscosity. Eventually the viscosity becomes so great that the material is essentially a solid. The gel now contains a large amount of residual solvent and, possibly, other reactant such as water. This excess material must be driven off prior to consolidation of the gel to the final product. Generally, drying is accomplished at relatively low temperatures. It may be carried out under positive pressures or some gas or it may be carried out in vacuum at low temperatures. In step 20, the coated core active material is dried under a reduced pressure in a range of about 20 inches of Hg. to about 50 inches of Hg., preferably about 30 inches of Hg., to remove the carrier solvent.

Consolidation is the last step in the sol-gel process. In the consolidation step 22, the dried material from step 20 is heat-treated to form the metal oxide or metal sulfide coating on the metal oxide or metal sulfide core particles. The heat treatment step is critical to controlling the composition of the product. The heating range is about 200° C. to about 500° C. for a time of about 10 minutes to about 6 hours. Longer heating times are required for lower temperatures. The maximum heating temperature is preferably below about 500° C. For example, relatively high heating temperatures (>500° C.) produce poor SVO or CSVO cathode active materials, regardless of whether the material is being coated, or not.

The amount of time the composite material is heated is also important in determining the final product. Relatively long reaction times are to be avoided because they promote ion diffusion of metal atoms from the coating to migrate to the core. For example; ion diffusion is particularly rapid in SVO and CSVO. Thus, the time and temperature parameters are key specific factors related to this invention.

Before fabrication into an electrode structure for incorporation into an electrochemical cell according to the present invention, the composite cathode active material prepared as described above is preferably mixed with a binder material such as a powdered fluoro-polymer, more preferably powdered polytetrafluoroethylene or powdered polyvinylidene flouride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoro-polymer binder present at about 3 weight percent, a conductive diluent present at about 3 weight percent and about 94 weight percent of the composite cathode active material.

Cathode components for incorporation into an electrochemical cell according to the present invention are prepared by rolling, spreading or pressing the cathode active mixture onto a suitable current collector selected from the group consisting of stainless steel, titanium, tantalum, platinum, aluminum, gold, nickel, and alloys thereof. The preferred current collector material is titanium, and most preferably the titanium cathode current collector has a thin layer of graphite/carbon paint applied thereto. Cathodes prepared as described above may be in the form of one or more plates operatively associated with at least one or more plates of anode material, or in the form of a strip wound with a corresponding strip of anode material in a structure similar to a "jellyroll".

The cathode current collector is connected to a terminal insulated from the cell casing (not shown) by a suitable glass-to-metal seal. This describes a case-negative cell design, which is the preferred form of the present invention cell. The cell can also be built in a case-positive design with the cathode current collector contacted to the casing and the anode current collector connected to a terminal lead insulated from the casing. In a further embodiment, the cell is built in a case-neutral configuration with both the anode and the cathode connected to respective terminal leads insulated from the casing by glass-to-metal seals. These terminal constructions are well known by those skilled in the art.

In order to prevent internal short circuit conditions, the cathode is separated from the Group IA, IIA or IIIB anode by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene/polyethylene membrane commercially available under the designation CELGARD (Celanese Plastic Company, Inc.), a membrane commercially available under the designation DEXIGLAS (C. H. Dexter, Div., Dexter Corp.), and a polyethylene membrane commercially available from Tonen Chemical Corp.

The electrochemical cell of the present invention further includes a nonaqueous, ionically conductive electrolyte serving as a medium for migration of ions between the anode and the cathode electrodes during electrochemical reactions of the cell. The electrochemical reaction at the electrodes involves conversion of ions in atomic or molecular forms that migrate from the anode to the cathode. Thus, suitable nonaqueous electrolytes are substantially inert to the anode and cathode materials, and they exhibit those physical properties necessary for ionic transport, namely, low viscosity, low surface tension and wettability.

A suitable electrolyte has an inorganic, ionically conductive salt dissolved in a mixture of aprotic organic solvents comprising a low viscosity solvent and a high permittivity solvent. In the case of an anode comprising lithium, preferred lithium salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof, and high permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-2-pyrrolidone (NMP), and mixtures thereof. In the present invention, the preferred anode is lithium metal and the preferred electrolyte is 0.8M to 1.5M $LiAsF_6$ or $LiPF_6$ dissolved in a 50:50 mixture, by volume, of propylene carbonate and 1,2-dimethoxythane.

The corrosion resistant glass used in the glass-to-metal seals has up to about 50% by weight silicon such as CABAL 12, TA 23, FUSITE 425 or FUSITE 435. The positive terminal leads preferably comprise molybdenum, although titanium, aluminum, nickel alloy, or stainless steel can also be used. The cell casing is an open container of a conductive material selected from nickel, aluminum, stainless steel, mild steel, tantalum and titanium. The casing is hermetically sealed with a lid, typically of a material similar to that of the casing.

The composite cathode active material comprising the first metal oxide or metal sulfide, preferably ϵ-phase SVO, coated with a second metal oxide or metal sulfide is particularly useful in electrochemical cells containing lithium anodes and non-aqueous electrolytes. In a typical cell, the cathode consists of a mixture of, by weight, about 94% of the composite cathode active material along with 3% PTFE, 2% graphite and 1% carbon black. The cathode is separated from the lithium anode by a layer of polypropylene separator. The cell is activated with 1 M $LiAsF_6$ in PC/DME (1:1) electrolyte. Pulse testing of the cell is accomplished by subjected it to high current pulses (~23 $mA/cm^2$) for 10 seconds in duration. The current pulses are applied in groups of four, with 15 seconds of rest between pulses. Time between application of the pulse groups ranges from several weeks to six months. Total discharge time for the cell is up to ten years. This makes the cell particularly well suited for powering an implantable medical device, such as a cardiac pacemaker, cardiac defibrillator, drug pump, neurostimulator, self-contained artificial heart, and the like.

FIGS. 2 and 3 show a patient P having a medical device 30, such as an implantable cardiac defibrillator, implanted inside the body. The enlarged schematic shows the medical device 30 comprising a housing 32 containing control circuitry 34 powered by an electrochemical cell 36 according to the present invention. The cell 36 is also connected to a capacitor 38. The control circuitry 34 is connected to at least one conductor 40 by a hermetic feedthrough 42, as is well known by those skilled in the art. The distal end of the conductor connects to the heart H for delivering a therapy thereto from the capacitor 108 charged by the cell 36.

Periodically, the patient will go to a medical facility, and the like, where the deliverable capacity determined by the control circuitry 34 is read to determine if the cell 36 has discharged to the point that it is approaching its end-of-life, typically at an open circuit voltage of about 2.0 volts. If so, this indicates that it is time for the physician to schedule the patient for surgery to replace the medical device with a new one.

The following examples describes the manner and process of an electrochemical cell according to the present invention, and they set forth the best mode contemplated by the inventors for carrying out the invention, but they are not to be construed as limiting.

EXAMPLE I

γ-phase SVO cathode material was prepared utilizing a sol-gel process according to the present invention. First, a 2.00-gram sample of $V_2O_5$ was combined with a 1.02-gram sample of $Ag_2O$ and a 0.013-gram sample of LiOH. A volume of 100 ml of distilled/de-ionized water was added to the mixture and heated to about 60° C. to about 70° C. with stirring for 2 hours. The mixture was then allowed to cool to room temperature and stirred for another 14 hours to 18 hours. The resulting deep red colored mixture was transferred to a round bottom flask and the solvent removed using a rotary evaporator under reduced pressure. The remaining solid was heated from room temperature to about 500° C. under an air atmosphere, and held at that temperature for about 15 minutes. Total heating time was about 1 hour. The sample was then cooled and analyzed by X-ray powder diffraction; differential thermal analysis and BET surface area measurements. The X-ray powder diffraction data confirmed the formation of γ-phase SVO. The cathode material displayed a BET surface area of about 0.90 $m^2$/gram.

COMPARATIVE EXAMPLE I

γ-phase SVO cathode material was prepared according to the prior art by mixing a 16.58-gram sample of $V_2O_5$ with a 10.05-gram sample of $Ag_2CO_3$. The mixture was heated to about 450° C. under an air atmosphere for about 16 hours. The sample was then cooled, mixed and reheated under an air atmosphere for about 16 hours. The sample was again cooled and mixed and then reheated under an air atmosphere at about 520° C. for about 21 hours. At this point the product material was cooled and analyzed by X-ray powder diffraction and BET surface area measurements. The X-ray powder diffraction data confirmed the formation of γ-phase SVO. The cathode material displayed a BET surface area of about 0.42 $m^2$/gram.

EXAMPLE II

The performance of γ-phase SVO prepared according to the present invention (Example I) was tested in Li/SVO electrochemical cells in comparison to the prior art γ-phase SVO (Comparative Example I). In particular, coin cells were constructed containing cathodes consisting of a mixture of 94% γ-phase SVO (by weight) along with 3% PTFE, 2% graphite and 1% carbon black. A total of 0.17 grams to 0.19 grams of cathode mix was used in each cell. The cathode mix was pressed into a pellet 13 mm in diameter. Lithium anodes measuring 0.012 inches thick were used in the coin cells. The cathodes were separated from the anodes by a layer of polypropylene separator. The cells were filled with 1 M $LiAsF_6$ in PC/DME (1:1) electrolyte, and then crimped shut.

Pulse testing consisted of subjecting the cells to constant current pulses of 31 mA for 10 seconds in duration. The current pulses were applied in groups of four every 30 minutes, with 15 seconds of rest between pulses. A 31 mA pulse current corresponds to a current density of about 23 $mA/cm^2$. Four coin cells were discharged for each cathode material, and the discharge results are set forth in Table 1.

TABLE 1

Pulse Discharge of Li/SVO Coin Cells

| Preparation | SVO Type | Average Capacity (mAh/g) | | |
|---|---|---|---|---|
| | | To +2.0 V | To +1.7 V | To +1.5 V |
| Example I | Sol-gel γ-phase | 158.2 | 250.8 | 279.2 |
| Comparative Example I | Prior art γ-phase | 128.8 | 189.4 | 209.9 |
| Example III | γ-phase coated ε-phase | 186.8 | 250.6 | 268.7 |
| Comparative Example III | Prior art ε-phase | 151.3 | 249.1 | 267.7 |

Figure 4:
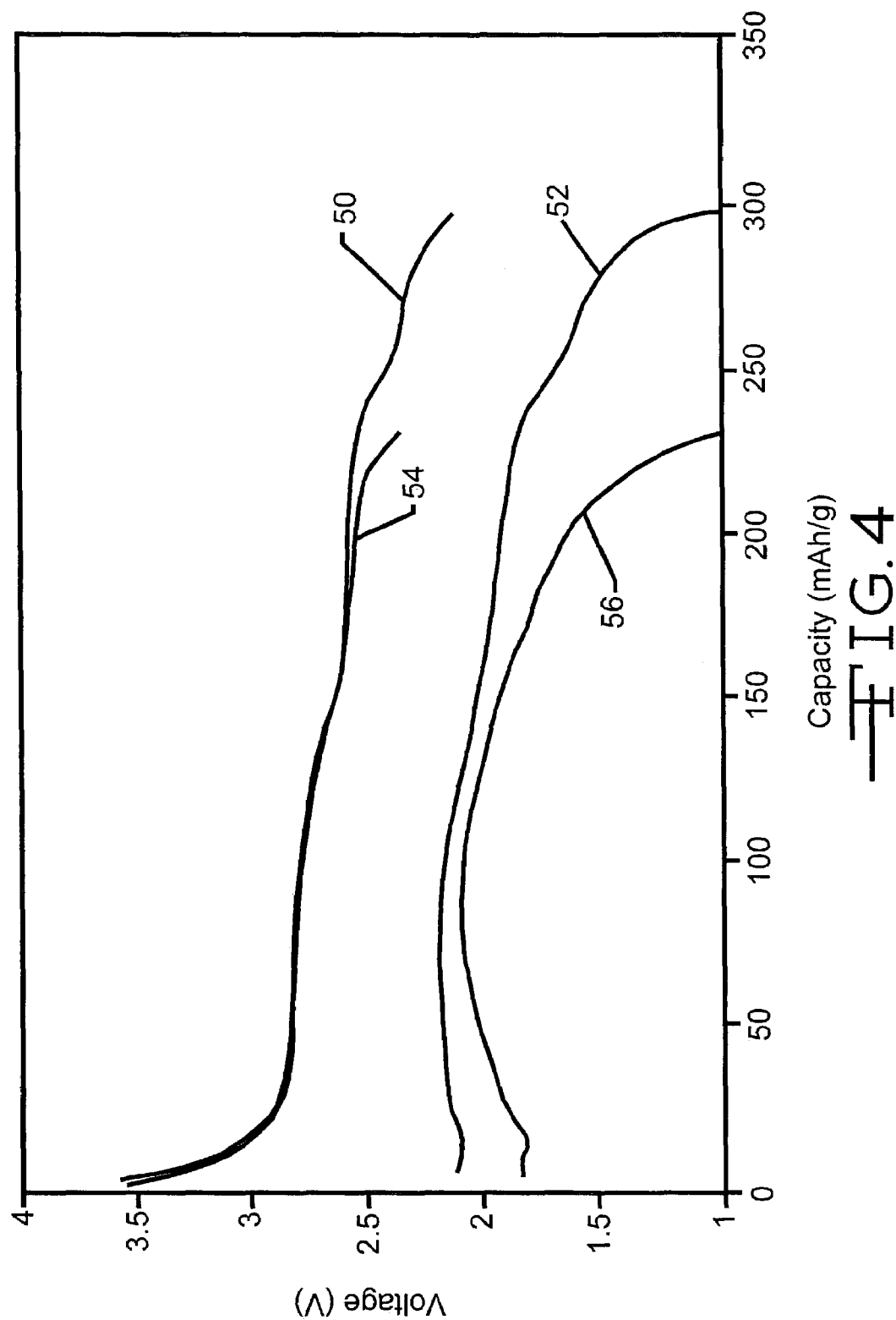
FIG. 4 is a graph showing comparative pulse discharge curves for cells containing cathodes having γ-phase SVO prepared by a sol-gel technique and by a prior art decomposition method.

As can be seen in Table 1, the sol-gel prepared γ-phase SVO of Example I delivered significantly higher capacity to each voltage cut-off (2.0V, 1.7V and 1.5V) in comparison to the prior art γ-phase SVO of Comparative Example I. An overlay of the voltage curves for these tests is shown in FIG. 4. In this figure, curve 50 was constructed from the average background voltage prior to the application of the pulse current for cells containing sol-gel γ-phase SVO of Example I while curve 52 is derived from the average minimum voltage during the application of the fourth pulse of each series for these cells. In contrast, curve 54 was constructed from the average background voltage prior to the application of the pulse current for cells containing the prior art γ-phase SVO of Comparative Example I while curve 56 is derived from the average minimum voltage during the application of the fourth pulse of each series for these cells.

EXAMPLE III

A composite SVO material according to the present invention containing a ε-phase SVO core provided with a γ-phase SVO coating was prepared. The γ-phase SVO coating was applied utilizing a sol-gel process. The preparation of sol-gel SVO was the same as described in Example I. In particular, a 2.00-gram sample of $V_2O_5$ was combined with a 1.02-gram sample of $Ag_2O$ and a 0.013-gram sample of LiOH. About 100 ml of distilled/de-ionized water was added to the mixture, which was then heated to about 60° C. to about 70° C. with stirring for about 2 hours. The mixture was allowed to cool to room temperature and stirred for about 14 hours to about 18 hours.

At this point, a 4.22-gram sample of the resulting deep red colored mixture was added to 1.50-gram sample of γ-phase SVO in a round bottom flask. The ratio of γ-phase SVO to ε-phase SVO in this mixture was 1:5. The solvent was removed from the mixture using a rotary evaporator under reduced pressure. The remaining solid was heated from room temperature to about 500° C. under an air atmosphere, and held there for about 15 minutes. Total heating time was about 1 hour. The resulting sample was then cooled and analyzed by X-ray powder diffraction; differential thermal analysis and BET surface area measurements. The X-ray powder diffraction data confirmed the presence of both ε-phase SVO and γ-phase SVO. The material had a BET surface area of 0.91 $m^2/g$.

It is believed that the ε-phase SVO particles have a size ranging from about 30 μm to about 300 μm. The γ-phase SVO coating on these core particles are believed to be about 1 μm to about 10 μm in thickness. Coatings greater than about 10 μm are not believed to offer additional benefits.

COMPARATIVE EXAMPLE III

ε-phase SVO was prepared by a prior art technique as a comparison to the new composite material containing a ε-phase SVO core coated with γ-phase SVO (Example III). In particular, a 15.00-gram sample of $V_2O_5$ was combined with an 11.38-gram sample of $Ag_2CO_3$ and heated to about 450° C. under an air atmosphere for about 16 hours. The sample was then cooled, mixed and reheated under an air atmosphere at about 500° C. for about 22 hours. At this point, the product material was cooled and analyzed by X-ray powder diffraction and BET surface area measurements. The X-ray powder diffraction data confirmed the formation of ε-phase SVO. The material displayed a BET surface area of 0.65 $m^2/grams$.

EXAMPLE IV

The discharge performance of γ-phase SVO coated ε-phase SVO according to the present invention (Example III) was tested in Li/SVO electrochemical coin cells in comparison to the prior art γ-phase SVO (Comparative Example III). The coin cells were constructed containing cathodes consisting of a mixture of 94% SVO (by weight) along with 3% PTFE, 2% graphite and 1% carbon black. A total of 0.17 grams to 0.19 grams of cathode mix was used in each cell. Lithium anodes measuring 0.012 inches thick were used in the coin cells. The cathodes were separated from the anodes by a layer of polypropylene separator. The cells were filled with 1 M $LiAsF_6$ in PC/DME (1:1) electrolyte, and then crimped shut.

Pulse testing was identical to that described in Example II with four coin cells being discharged for each cathode material. As can be seen in Table 1, the ε-phase SVO coated with γ-phase SVO of Example III delivered similar capacities to voltage cut-offs of 1.7V and 1.5V when compared to the prior art ε-phase SVO cells of Comparative Example III. However, the composite cathode material of Example III delivered significantly higher capacity to a voltage cut-off of +2.0V in comparison to the prior art ε-phase SVO material. Thus, the composite cathode material of Example III provided higher discharge capacity under a high rate pulse discharge regime and, in addition, is expected to display less voltage delay than the prior art ε-phase SVO. This is believed to be due to the presence of the γ-phase SVO coating on the ε-phase SVO.

Figure 5:
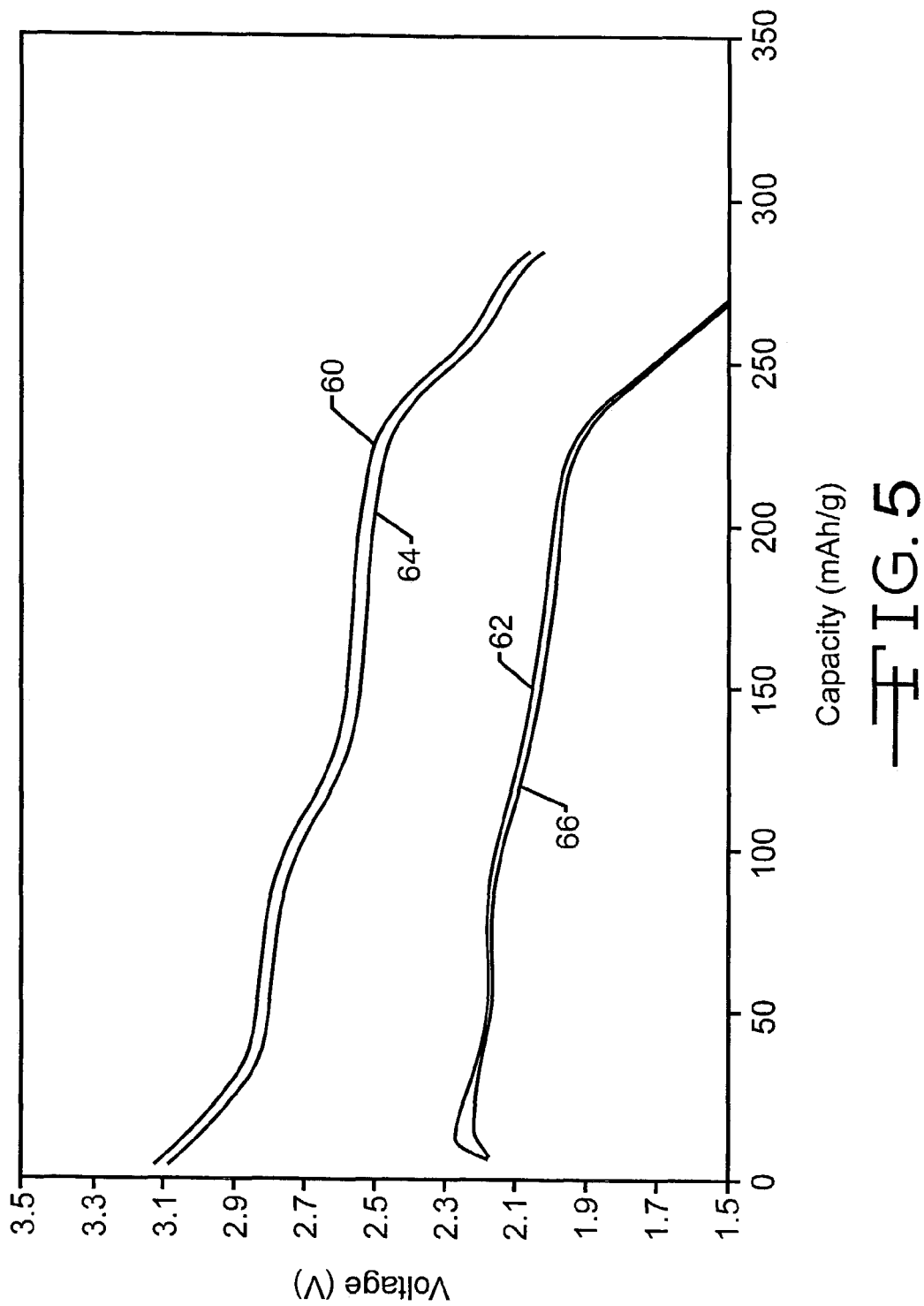
FIG. 5 is a graph showing pulse discharge curves for cells containing cathodes having γ-phase SVO coating ε-phase SVO prepared by a sol-gel technique in comparison to cells containing cathodes having ε-phase SVO prepared by a prior art decomposition method.

An overlay of the average voltage curves for these discharge tests is illustrated in FIG. 5. In this figure, curve 60 was constructed from the average background voltage prior to the application of the pulse current for cells containing sol-gel γ-phase SVO coated ε-phase SVO material of Example III while curve 62 is derived from the average minimum voltage during the application of the fourth pulse of each series for these cells. In contrast, curve 64 was constructed from the average background voltage prior to the application of the pulse current for cells containing the prior art ε-phase SVO of Comparative Example III while curve 66 is derived from the average minimum voltage during the application of the fourth pulse of each series for these cells.

The increased delivered capacity for the cells containing the composite cathode material of the present invention provides an improvement over prior art cathode materials. Higher capacity translates into greater longevity when these cells are used to power an implantable medical device. As an alternative, increased cathode capacity can also be used to design a cell with a smaller volume that delivers energy comparable to that of a larger cell containing prior art SVO cathode material. The decreased cell size then provides the advantage of a smaller overall device size.

It is appreciated that various modifications to the inventive concepts described herein may be apparent to those of ordinary skill in the art without departing from the spirit and scope of the present invention as defined by the appended claims.

What is claimed is:

1. An electrochemical cell, which comprises:
   a) an anode of an alkali metal;
   b) a cathode of a composite cathode active material comprising a core of either $\epsilon$-phase silver vanadium oxide (SVO) or copper silver vanadium oxide (CSVO), and mixtures thereof as a first cathode active material provided with a coating selected from the group consisting of $\beta$-phase SVO, $\gamma$-phase SVO, $MnO_2$, and mixtures thereof as a second cathode active material; and
   c) an electrolyte activating the anode and the cathode.

2. The electrochemical cell of claim 1 wherein the anode is lithium.

3. The electrochemical cell of claim 1 wherein the composite cathode active material is contacted to a cathode current collector selected from the group consisting of stainless steel, titanium, tantalum, platinum, aluminum, gold, nickel, and alloys thereof.

4. The electrochemical cell of claim 1 wherein the core of the first cathode active material is of particles having a size of from about 30 μm to about 300 μm.

5. The electrochemical cell of claim 1 wherein the coating of the second cathode active material is of a thickness of about 1 μm to about 10 μm.

6. The electrochemical cell of claim 1 in a case-negative design having the anode electrically connected to the casing and the cathode electrically connected to a terminal electrically insulated from the casing.

7. The electrochemical cell of claim 1 wherein the electrolyte has a first solvent selected from the group consisting of tetrahydrofuran, methyl acetate, diglyme, triglyme, tetraglyme, dimethyl carbonate, 1,2-dimethoxyethane, 1,2-diethoxyethane, 1-ethoxy, 2-methoxyethane, ethyl methyl carbonate, methyl propyl carbonate, ethyl propyl carbonate, diethyl carbonate, dipropyl carbonate, and mixtures thereof, and a second solvent selected from the group consisting of propylene carbonate, ethylene carbonate, butylene carbonate, acetonitrile, dimethyl, sulfoxide, dimethyl, formamide, dimethyl acetamide, $\gamma$-valerolactone, $\gamma$-butyrolactone, N-methyl-2-pyrrolidone, and mixtures thereof.

8. The electrochemical cell of claim 1 wherein the electrolyte includes a lithium salt selected from the group consisting of $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

9. The electrochemical cell of claim 1 in a case-positive design having the cathode electrically connected to the casing and the anode electrically connected to a terminal electrically insulated from the casing.

10. The electrochemical cell of claim 1 in a case-neutral design having the anode and cathode electrically connected to respective terminals electrically insulated from the casing.

11. An implantable medical device, which comprises:
    a) a device housing;
    b) control circuitry contained inside the device housing;
    c) an electrochemical cell housed inside the device housing for powering the control circuitry, the cell comprising:
       i) an anode comprising lithium;
       ii) a cathode of a composite cathode active material comprising a core of $\epsilon$-phase silver vanadium oxide (SVO) having its individual particles provided with a coating of $\gamma$-phase SVO; and
    d) a nonaqueous electrolyte activating the anode and the cathode; and
    e) a lead connecting the device housing to a body part intended to be assisted by the medical device, wherein the electrochemical cell powers the control circuitry both during a device monitoring mode to monitor the physiology of the body part and a device activation mode to provide a therapy to the body part.

12. The implantable medical device of claim 11 wherein the composite cathode active material is contacted to a cathode current collector selected from the group consisting of stainless steel, titanium, tantalum, platinum, aluminum, gold, nickel, and alloys thereof.

13. The implantable medical device of claim 11 wherein the core is of particles having a size of from about 30 μm to about 300 μm and the coating is of a thickness of about 1 μm to about 10 μm.

14. A method for providing a composite cathode active material, comprising the steps of:
    a) providing a core cathode active material selected from the group consisting of $\epsilon$-phase silver vanadium oxide (SVO), copper silver vanadium oxide (CSVO), and mixtures thereof in a granular form;
    b) providing a solution of an organic solvent having a coating material selected from the group consisting of $\beta$-phase SVO, $\gamma$-phase SVO, and mixtures thereof provided therein;
    C) mixing the core cathode active material into the solution containing the coating material to thereby form a sol-gel of the coating material coating the core cathode active material;
    d) drying the resulting coated core cathode active material to substantially remove the organic solvent; and
    e) heating the dried coated core cathode active material to provide the composite cathode active material.

15. The method of claim 14 including providing the sol-gel solution as either an aqueous or a nonaqueous solution.

16. The method of claim 14 including mixing the coating material with the core cathode active material in a range, by weight, of about 1:3 to about 1:20.

17. The method of claim 14 including drying the coated core cathode active material at a reduced pressure in a range of about 20 inches of Hg. to about 50 inches of Hg.

18. The method of claim 14 including drying the coated core cathode active material at a temperature in a range of about 200° C. to about 500° C.

19. The method of claim 14 including drying the coated core cathode active material for a time of about 10 minutes to about 6 hours.

20. An electrochemical cell, which comprises:
    a) an anode of lithium;
    b) a cathode of a core of a composite cathode active material selected from the group consisting of $\epsilon$-phase silver vanadium oxide (SVO), $\beta$-phase SVO, $\gamma$-phase SVO, CSVO, $V_2O_5$, $MnO_2$, $LiCoO_2$, $LiNiO_2$, $LiMnO_2$, $LiMn_2O_4$, $CuO_2$, $TiS_2$, $Cu_2S$, FeS, $FeS_2$, $Ag_2O$, $Ag_2O_2$, CuF, $Ag_2CrO_4$, copper vanadium oxide, and mixtures thereof having its individual particles coated with a coating material selected from the group consisting of $\gamma$-phase SVO, $\beta$-phase SVO, $MnO_2$, and mixtures thereof, wherein the core material and the coating material are not the same; and
    c) an electrolyte activating the anode and the cathode.

* * * * *

UNITED STATES PATENT AND TRADEMARK OFFICE
CERTIFICATE OF CORRECTION

| | | |
|---|---|---|
| PATENT NO. | : 7,211,349 B2 | Page 1 of 1 |
| APPLICATION NO. | : 10/631097 | |
| DATED | : May 1, 2007 | |
| INVENTOR(S) | : Leising et al. | |

It is certified that error appears in the above-identified patent and that said Letters Patent is hereby corrected as shown below:

Column 1, line 34: delete "rate pulse" and insert --rate pulse discharge.--

Signed and Sealed this

Sixth Day of May, 2008

JON W. DUDAS
*Director of the United States Patent and Trademark Office*